United States Patent
Van Der Eerden et al.

(10) Patent No.: US 12,421,048 B2
(45) Date of Patent: Sep. 23, 2025

(54) ATTACHMENT UNIT FOR CONVEYOR BELT MODULE

(71) Applicants: Marel Poultry B.V., AV Boxmeer (NL); Ammeraal Beltech Modular A/S, Vejle (DK)

(72) Inventors: Harry Van Der Eerden, AV Boxmeer (NL); Germ Buter, Vejle (DK); Kenneth Westergaard Andersen, Vejle (DK)

(73) Assignees: Marel Poultry B.V., AV Boxmeer (NL); Ammeraal Beltech Modular A/S, Vejle (DK)

( * ) Notice: Subject to any disclaimer, the term of this patent is extended or adjusted under 35 U.S.C. 154(b) by 54 days.

(21) Appl. No.: 18/029,772

(22) PCT Filed: Oct. 8, 2021

(86) PCT No.: PCT/EP2021/077889
§ 371 (c)(1),
(2) Date: Mar. 31, 2023

(87) PCT Pub. No.: WO2022/074211
PCT Pub. Date: Apr. 14, 2022

(65) Prior Publication Data
US 2023/0356952 A1    Nov. 9, 2023

(30) Foreign Application Priority Data

Oct. 9, 2020    (EP) ..................................... 20201188

(51) Int. Cl.
*B65G 17/46*    (2006.01)
*B65G 17/08*    (2006.01)

(52) U.S. Cl.
CPC ............. *B65G 17/46* (2013.01); *B65G 17/08* (2013.01)

(58) Field of Classification Search
CPC .... B65G 17/46; B65G 17/08; B65G 2207/30; B65G 2812/02376
See application file for complete search history.

(56) References Cited

U.S. PATENT DOCUMENTS 3,269,523 A * 8/1966 Creswell ................ B65G 15/44
    198/618
3,734,269 A * 5/1973 Ross ...................... B65G 17/46
    198/698

(Continued)

OTHER PUBLICATIONS

IPSearch History Jun. 4, 2025 UTC; InnovationQ+; https://iq.ip.com/discover (Year: 2025).*

(Continued)

*Primary Examiner* — Gene O Crawford
*Assistant Examiner* — Abby A Jorgensen
(74) *Attorney, Agent, or Firm* — Osha Bergman Watanabe & Burton LLP

(57) ABSTRACT

An attachment unit comprising a flight part and an attachment part comprising first and second sets of protrusions wherein each of the protrusions extends away from the flight part in the first transverse direction, and wherein each of the first set of protrusions and the second set of protrusions comprises one or more protrusions, each having one or more protuberances and/or cavities each extending in a longitudinal direction and/or a second transverse direction, and wherein the first set of protrusions is off-set along the second transverse direction.

14 Claims, 4 Drawing Sheets

(56) References Cited

U.S. PATENT DOCUMENTS

| | | | | |
|---|---|---|---|---|
| 4,832,183 | A * | 5/1989 | Lapeyre | B65G 17/08 198/690.2 |
| 4,865,182 | A * | 9/1989 | Nolte | B65G 15/42 198/698 |
| 5,413,211 | A * | 5/1995 | Faulkner | B65G 17/086 198/853 |
| 5,490,591 | A * | 2/1996 | Faulkner | B65G 17/08 198/803.13 |
| 6,382,404 | B1 * | 5/2002 | Guldenfels | B65G 17/32 198/853 |
| 6,695,135 | B1 * | 2/2004 | Lapeyre | B65G 17/08 198/853 |
| 7,494,006 | B2 * | 2/2009 | Knott | B65G 17/42 198/853 |
| 9,443,372 | B2 * | 9/2016 | Mockus | G07F 11/24 |
| 10,800,610 | B1 * | 10/2020 | De Graw | B65G 15/42 |

OTHER PUBLICATIONS

International Search Report and Written Opinion in corresponding International Application No. PCT/EP2021/077889, dated Mar. 12, 2021 (11 pages).

European Search Report in corresponding European Application No. 20201188.8, dated Mar. 26, 2021 (8 pages).

* cited by examiner

ATTACHMENT UNIT FOR CONVEYOR BELT MODULE

FIELD OF THE INVENTION

The invention relates to an attachment unit for a conveyor belt module, and more particularly an attachment unit arranged for exerting a force during use in a conveying direction on an element to be conveyed, conveyor belt module, and furthermore relates to a corresponding conveyor belt unit, a modular conveyor belt, a modular conveyor belt system, a method for conveying one or more elements and use of the attachment unit.

BACKGROUND OF THE INVENTION

When conveying one or more elements on a conveyor, it may be a challenge to accelerate (i.e., change momentum of), e.g., round (or rolling) objects and/or to counteract gravity in case of a conveying direction being non-horizontal (such as being inclined upwards in a conveying direction), such as when conveying, e.g., round (or rolling) elements or elements having coefficient of friction being insufficient for providing sufficient friction force for conveying the elements in the conveying direction.

In order to exert a (additional) force in a conveying direction, the conveyor may comprise means, such as flights, for exerting a force on the elements to be conveyed, e.g., in a conveyor conveying elements upwardly and/or downwardly, which may enable controlling the movement of the objects to be conveyed in a direction parallel with the conveying direction. In some cases, when conveyors convey upwards relative to gravity, the objects would have remained stationary or would even have rolled or slid in an opposite direction to the conveying direction in the absence of the means for exerting the force on the elements.

Hence, improved means for exerting a force, conveyor belt module and a corresponding modular conveyor belt, conveyor belt module system, a modular conveyor belt system, method for conveying one or more elements and use of modular conveyor belt would be advantageous, and in particular improved means for exerting a force, conveyor belt module and a corresponding modular conveyor belt, conveyor belt module system, a modular conveyor belt system, method for conveying one or more elements and use of modular conveyor belt which improves flexibility and/or cleanability would be advantageous.

SUMMARY OF THE INVENTION

It may be seen as an object of the present invention to provide improved means for exerting a force, conveyor belt module and a corresponding modular conveyor belt, conveyor belt module system, a modular conveyor belt system, method for conveying one or more elements and use of modular conveyor belt, which overcomes the problems mentioned above. It may be a further object of the present invention to provide an alternative to the prior art. Thus, the above described object and several other objects are intended to be obtained in a first aspect of the invention by providing an attachment unit, such as attachment unit for attachment to an assembled modular conveyor belt, such as for attachment to a conveyor belt module, the attachment unit defining:
a longitudinal direction,
a first transverse direction being perpendicular to each of the longitudinal direction,
a second transverse direction being perpendicular to each of the longitudinal direction and the first transverse direction,
the attachment unit comprising:
a flight part, such as for slowing down or blocking, an element;
an attachment part comprising:
a first set of protrusions comprising one or more protrusions; and
a second set of protrusions comprising one or more protrusions;
where each of the protrusions is extending away from the flight part in the first transverse direction,
where each of the first set of protrusions and the second set of protrusions comprises one or more protrusions, which each has one or more protuberances and/or cavities each extending in a longitudinal direction and/or a second transverse direction, such as a hook for engaging with a recess of the modular conveyor belt, such as of a conveyor belt module, and
wherein the first set of protrusions is off-set along the second transverse direction.

A possible advantage of the present invention may be that it enables mounting the attachment unit to an assembled modular conveyor belt, for example by mounting to a central beam of a conveyor belt module (which may be realized by having the off-set, which allows a central beam to be placed between the first set of protrusions and the second set of protrusions). A possible advantage of connecting the attachment unit to the central beam may be that it provides a stronger attachment and/or that it enables placing the attachment unit in a position where it is least obstructing with respect to side flexing and/or out-out-plane (such as out of a side flexing plane) movements of the assembled conveyor belt. Another possible advantage of the present invention may be that it provides an attaching unit, which can be attached to and detached from an assembled modular conveyor belt (without any need for disassembling parts of the modular conveyor belt, such as for removing rods and or conveyor belt modules), which may in turn yield a large degree of freedom (because it might be repeatedly retrofitted and removed according to changing needs) and/or because upon, e.g., temporary, removal, it can facilitate an improved cleaning.

The 'attachment unit' is a unit, such as a (optionally injection moulded) monolithic unit for, for allowing attachment to an assembled modular conveyor belt and comprising a flight part, which is arranged for (during use) exerting a force on an element, such as an element to be conveyor by a conveyor onto which the attachment unit is attached. The attachment unit may be a click-on unit, such as a unit clicking (e.g., due to one or more flexible parts engaging with extensions and/or recesses) onto the conveyor belt module.

The 'longitudinal direction' may be understood to be along a length axis and/or an axis of minimum moment of inertia.

By 'a flight part' (which may be understood synonymously with 'a means for exerting a force on an element'), may be understood an element which, during use, is arranged for exerting a force on an object to be conveyed, such as with the purpose of slowing down or blocking a movement of the element relative to the conveyor surface in a direction opposite the conveying direction. Said flight part may be an element for exerting a force in a direction normal to surfaces at a point of contact, such as a flight (e.g., being mounted with a surface orthogonal to a load-carrying surface of the conveyor), or parallel to surfaces at a point of contact, such as a (high-friction) surface mounted parallel with a surface of the conveyor. The 'flight part' may be understood to—when mounted on an assembled modular belt conveyor'—have a height (i.e., a length from the load carrying surface to a point (height) away from the load-carrying surface in a direction orthogonal to the plane of the modular conveyor belt and/or the load carrying surface, which might be opposite with respect to a direction of the protrusions) within an interval of [0; 100] cm, such within an interval of ]0; 100] cm, such as within an interval of [2; 50] cm. Embodiments with a height of 0 cm or close to 0 cm may comprise a high-friction surface. A longitudinal width of the flight part may be so that during use (such as when mounted on the assembled modular conveyor band), it extends—in a direction orthogonal to the conveying direction in the plane of the conveyor—within [1; 100] % of a width of the conveyor, such as within [10; 100] % of a width of the conveyor, such as within [20; 80] % of a width of the conveyor, such as within [25; 75] % of a width of the conveyor. A longitudinal width of the flight part may be within an interval of [1; 200] cm, such within an interval of [1; 100] cm, such within an interval of [10; 100] cm, such as within an interval of [20; 100] cm, such as within an interval of [25; 75] cm.

'Conveyor' may throughout this application be used interchangeably with 'modular conveyor belt'.

By 'attachment part' may be understood a part of the attachment unit arranged for, such as comprising means (such as protrusions with protuberances and/or cavities) for, engaging in a fixed relationship with an assembled modular conveyor belt.

A 'first set of eye parts' or 'a second set of eye parts' is understood as is common in the art, such as allowing a straight, rigid or flexible, rod to pass through the first or second set of eye parts.

By 'defining a first axis' or 'defining a second axis' may be understood that an axis, such as an axis through a center of the first or second set of eye parts, is defined by the first or second set of eye parts. It is encompassed that the first and/or second axis is curved. The first and/or second axis may be straight. The first axis and the second axis may be substantially parallel, such as parallel.

The first set of eye parts and/or the second set of eye parts may comprise oblong holes, such as oblong holes with a longest extension in a plane orthogonal to the first axis and/or the second axis being in a direction parallel with a line intersecting each of the first axis and the second axis (such as the holes having a horizontal major axis in a plane orthogonal to the first axis and/or the second axis in case of a conveyor belt module with the first and second axis being in the same horizontal plane).

By 'protrusions' may be understood elements extending from a body or a surface, such as pins, legs, pylons or extensions.

By 'protuberances' may be understood elements extending from a body or a surface, such as pins, legs, pylons or extensions. It may be understood that the protuberances alone and/or the protuberances in combination with the protrusions may form means for engaging in a fixed relationship with spatial structures, such as recesses and/or extensions, of an assembled conveyor belt module.

By 'cavities' may be understood an unfilled space within a body (such as the "negative of" an element extending from a body or a surface, such as pins, legs, pylons or extensions), such as within the protrusion, such as any one of a recess, an indentation, a non-through-going hole and a through-going hole. It may be understood that the cavities alone and/or the cavities in combination with the protrusions may form means for engaging in a fixed relationship with spatial structures, such as extensions, of an assembled conveyor belt module.

It is generally understood, that the protrusions may comprise protuberances and/or cavities depending on a shape of an assembled modular conveyor belt to which it is to be attached. For example, a conveyor belt module of the assembled modular conveyor belt may comprise recesses for engaging (mating) with protuberances of the protrusions of the attachment part of the attachment unit and/or the conveyor belt module of the assembled modular conveyor belt may comprise extensions for engaging (mating) with cavities of the protrusions of the attachment part of the attachment unit.

By 'wherein the first set of protrusions is off-set along the second transverse direction' may be understood that there is a gap between the first set of protrusion s and the second set of protrusions, wherein said gap extends in the second transverse direction. It may be understood that a line can be drawn in a longitudinal direction between the first set of protrusions and the second set of protrusions, wherein the first set of protrusions and the second set of protrusions are, such as exclusively are, on each side of a plane spanned by the longitudinal direction and the first transverse direction.

The assembled modular conveyor belt may be a side flexing conveyor belt. A 'side flexing modular conveyor belt' is understood as is common in the art, such as wherein a plurality of, optionally similar or identical, conveyor belt modules are combined in to a conveyor belt, said conveyor belt allows turning in a plane of the conveyor belt (such as for a conveyor belt having a horizontal plane allowing turning around a vertical axis), such as at least turning with a turning radius of 100 m or less, such as 10 m or less, such as 1 m or less. Side flexing may be allowed e.g., by having at least a part of the conveyor belt module being made of a flexible, such as elastic material and/or by having the first set of eye parts and/or the second set of eye parts comprising, such as consisting of, oblong eye parts. By a side flexing modular conveyor belt may generally be understood a modular conveyor belt which can be adapted to follow a curved path.

The protrusions may have a length chosen such that the protrusions do not extend beyond the modular conveyor belt, such as beyond an underside of the modular conveyor belt or under the modular conveyor belt. Thereby the risk of collision between the protrusions and anything in the conveyor structure is removed or reduced.

The attachment unit may in some cases be elongated, such as in the longitudinal direction.

In an embodiment the flight part may be a flange extending from the attachment part. The flange may be a flight. The direction of the flange may be in a direction opposite to the one or more protrusions, which in practice might mean that the flight will be substantially perpendicular to the conveying surface of the conveyor. However it is also contemplated that the flight is arranged at an angle to the conveying surface.

In an embodiment the flight part may be a high friction surface for engaging an object to be conveyed. The high-friction surface may be a rubber surface, or the surface may be provided with barbs, serrations or the like. The high-friction surface may be understood to enable a higher friction than a modular conveyor belt upon which it is to be attached, such as upon which it is attached.

In an embodiment there is presented an attachment unit, wherein:
The first set of protrusions comprises, such as consists of, a first row of protrusions comprising a plurality of protrusions, the first row being substantially parallel, such as parallel, to the longitudinal direction, such as wherein at least one protrusion within the first row of protrusions comprises one or more protuberances and/or cavities each extending in a longitudinal direction and/or a second transverse direction, such as a hook for engaging with a recess and/or an extension of a modular conveyor belt, such as of a modular conveyor belt module;
The second set of protrusions comprises, such as consists of, a second row of one or more protrusions comprising a plurality of protrusions, the second row being substantially parallel, such as parallel, to the longitudinal direction, such as wherein at least one protrusion within the second row of protrusions comprises one or more protuberances and/or cavities each extending in a longitudinal direction and/or a second transverse direction, such as a hook for engaging with a recess and/or an extension of a modular conveyor belt, such as of a modular convey-or belt part,
wherein the first row of protrusions and the second row of protrusions are off-set along the transverse direction.

A possible advantage may be that a compact design can be provided where the first and second rows forms a tight fit around a central beam of a conveyor belt module, such as ensuring a tight grip and/or being out of the way of moving parts, such out of the way of rods for connecting the conveyor belt module to adjacent conveyor belt modules and/or out of the way of adjacent conveyor belt modules (which may move relative to the conveyor belt module upon which the attachment unit is attached, e.g., during side flexing and/or out-of-plane movements.

By (first and second) 'row' of protrusion may be understood that the protrusions within the row are substantially aligned, such as aligned, along a (straight) line.

In an embodiment there is presented an attachment unit, wherein each protuberance is arranged for engaging with a recess and/or an extension of a modular conveyor belt, such as a conveyor belt module.

In an embodiment there is presented an attachment unit, wherein each protuberance is anyone of a hook, a barb and a detent ball.

In an embodiment there is presented an attachment unit, wherein each cavity is arranged for engaging with an extension of a modular conveyor belt, such as a conveyor belt module.

In an embodiment there is presented an attachment unit, wherein a pair of protrusions comprises a protrusion from each of the first set of protrusions, such as the first row of protrusions, and the second set of protrusions, such as the second row of protrusions, wherein the protrusions within said pair of protrusions are separated in a longitudinal direction, and optionally being nearest neighbors in a longitudinal direction, and wherein each protrusion within said pair of protrusions comprise a protuberance extending in a longitudinal direction towards the other protrusion within said pair and/or a cavity extending in a longitudinal direction away from the other protrusion within said pair.

In an embodiment there is presented an attachment unit, wherein the attachment unit comprises two protrusions with protuberances and/or cavities, wherein said two protrusions are positioned in each end along the longitudinal direction of the attachment unit, such as the two protrusions being outermost positioned protrusions in each longitudinal end. This may be advantageous for maximizing a torque applied on the attachment unit via the protuberance and/or the cavity with respect to rotation around an axis parallel with a conveying direction, which may in turn be beneficial for ensuring the attachment unit remains stably attached to the assembled modular conveyor belt.

In an embodiment there is presented an attachment unit, wherein the flight part, such as the means for exerting a force on an element, comprises:
a plate or flange extending from the attachment unit, such as extending in a direction being substantially opposite, such as opposite to a direction of extension of the one or more protrusions in the first set of protrusions and the one or more protrusions in the second set of protrusions; and/or
a high friction surface, such as a surface enabling having a larger friction coefficient between the high friction surface and an element than a friction coefficient between a surface of the attachment unit and the element.

According to a second aspect, there is presented a conveyor belt module, such as a conveyor belt module for a modular conveyor belt, such as for a side flexing modular conveyor belt, said conveyor belt module comprising one or more recesses and/or extensions for engaging with the one or more protuberances and/or cavities of the attachment unit according to the first aspect.

By 'conveyor belt module' may be understood a module which can be combined with other modules, such as other similar or identical modules, optionally by means of rods through first axes and the second axes for first and second sets of eye parts, to form some or all of a modular conveyor belt, such as wherein one or more surfaces of the modules form a load surface of the conveyor belt.

By 'recess' may be understood any structural shape with which a protuberance can interact, such as a through-going hole, a non-through-going hole, an indentation or, cavity, a bevelled edge or a rounded edge. It may be understood that the 'recess' in the conveyor belt module is arranged so that the protuberance (of the attachment unit) can interact with the recess without extending beyond a circumscription of the conveyor belt module.

By 'extension' (of the conveyor belt module) may be understood any structural shape with which a cavity can interact, such as a pin, a leg, a pylon or a protuberance. It may be understood that the 'extension' in the conveyor belt module is arranged so that the cavity (of the attachment unit) can interact with the extension without extending beyond a circumscription of the conveyor belt module.

In an embodiment there is presented a conveyor belt module being a conveyor belt module for a modular conveyor belt, such as side flexing modular conveyor belt and/or modular conveyor belt comprising a plurality of conveyor belt modules, the conveyor belt module comprising
a central beam;
a first set of eye parts extending from beam and defining a first axis, such as a first rod axis; and
a second set of eye parts extending from the beam, such as in an opposite direction with respect to a direction of extension of the first set of eye parts and/or off-set along the longitudinal direction with respect to the first set of eye parts, and defining a second axis, such a second rod axis.

A center plane is spanned by:
An axis being parallel with the first axis and/or the second axis, and An axis being orthogonal to the first axis and/or the second axis and intersecting both of the first axis and the second axis.

The conveyor belt module has a load-carrying surface, such as a load carrying surface being substantially parallel with the center plane and/or planar. The load carrying surface of a central part of the conveyor belt module (such as between outermost eye parts) may be flush with a load carrying surface of one or both outermost eye parts. The conveyor belt module may be connected to an identical conveyor belt module so that load carrying surfaces of (directly, such as with no intermediate elements) connected conveyor belt modules have a planar and uninterrupted load carrying surface in a cross-sectional plane orthogonal to the first axis and/or the second axis.

Opposite the load-carrying side, there may be an underside, and the one or more recesses and/or extensions may be on the opposite (under-)side of the center plane with respect to the load-carrying side, such as on or in edges on this opposite (under-)side.

It may in general be understood that one or more recesses and/or extensions may be positioned on or in edges on a distal side with respect to the center plane, such as on or in an underside.

The conveyor belt module may comprise an elongated (and oriented in a direction of the first axis and/or the second axis) central beam from which the first set of eye parts are extending in a first transverse direction (in the central plane and orthogonal to the first axis and/or the second axis) and the second set of eye parts are extending in a second transverse direction (in the central plane and orthogonal to the first axis and/or the second axis) being substantially opposite, such as opposite (such as anti-parallel), to the first transverse direction.

'Conveyor belt' may generally be understood to be an endless conveyor comprising a plurality of traction elements each given by a conveyor belt module. The surface of the conveyor belt may be formed by the surface of the traction elements. The conveyor belt may be capable of, such as adapted to, follow a curved path in two or three dimensions.

In an embodiment there is presented a conveyor belt module wherein the conveyor belt module has rotational symmetry of second order around one or more of:
  An axis being parallel with the first axis and/or the second axis,
  An axis being orthogonal to the first axis and/or the second axis and intersecting both of the first axis and the second axis, and
  An axis being orthogonal to each of.
    The axis being parallel with the first axis and/or the second axis, and
    The axis being orthogonal to the first axis and/or the second axis and intersecting both of the first axis and the second axis.

A possible advantage may be that the conveyor belt module can be rotated, e.g., turned upside-down, and still be mounted correctly in a modular conveyor belt (such as being "fool-proof" during installation). The rotational symmetry may be a two-fold rotational symmetry, such as a rotation symmetry where a similar or identical shape emerges upon rotation 180°. A possible advantage of two-fold rotational symmetry (e.g., around an axis being orthogonal to the first axis and/or the second axis and intersecting both of the first axis and the second axis) may be that it may enable turning the conveyor belt around, such as upside-down, which may in turn beneficial for enabling rotating a conveyor belt module 180° to allow it to be worn on another side with respect to a possibly worn out side, e.g., turning it upside down in case of a worn upper side, which then allow the previous non-worn underside to become the new ready-to-use upper side, i.e., effectively doubling a life-time of the conveyor belt module with possible associated benefits in terms of resources, economy and environment.

In an embodiment there is presented a conveyor belt module wherein the conveyor belt module comprises a monolithic element comprising at least
  the first set of eye parts,
  the second set of eye parts, and
  the portions of material A possible advantage of this may be that strength will increase since there will be no weak joints. Another possible advantage may be that it is hygienic because there will be no joints where dirt, bacteria, etc., can attach. A monolithic conveyor belt module may for example be provided by injection moulding.

In an embodiment there is presented a conveyor belt module wherein the conveyor belt module comprises, such as consists of, polymeric material, such as a single type of polymeric material.

In an embodiment there is presented a conveyor belt module wherein the conveyor belt module comprises, such as consists of, polymeric material, such as a single type of polymeric material.

In an embodiment there is presented a conveyor belt module wherein the conveyor belt module can be joined to an identical conveyor belt module by:
  Positioning the conveyor belt module and the identical conveyor belt module so that
    the first axis of the conveyor belt module and the second axis of the identical conveyor belt module are coaxial,
    the positions of the conveyor belt module and the identical conveyor belt module along the first axis of the conveyor belt module are similar or identical,
  Inserting a rod through the first eye parts of the conveyor belt module and the second set of eye parts of the identical conveyor belt module.

In an embodiment there is presented a conveyor belt module, wherein said plurality of recesses and/or extensions comprises at least one recess and/or extension on each side of a plane through the central beam, such as through a center of mass of the central beam, and being orthogonal to an axis being
    orthogonal to the first axis and/or the second axis, and
    intersecting each of the first axis and the second axis.

A possible advantage is that this allows attachment of the attachment unit according to the first aspect with points of attachment on both sides of the central beam (such as on both sides of the central beam with respect to a conveying direction during use), which may in turn yield a tight fit and/or avoid detracting from the mobility of the conveyor belt module in an assembled modular conveyor belt.

In an embodiment there is presented a conveyor belt module comprising:
  a first recess and/or extension being positioned between two neighboring eye parts of the first set of eye parts, and/or
  a second recess and/or extension being positioned between two neighboring eye parts of the second set of eye parts.

A possible advantage is—in analogy with the preceding embodiment—that this allows attachment of the attachment unit according to the first aspect with points of attachment on both sides of the central beam, which may in turn yield a tight fit and/or avoid detracting from the mobility of the conveyor belt module in an assembled modular conveyor belt.

In an embodiment there is presented a conveyor belt module, wherein the conveyor belt module comprises:
two or more first recesses and/or extensions positioned within different pairs of neighboring eye parts of the first set of eye parts, and/or
two or more second indentations positioned within different pairs of neighboring eye parts of the second set of eye parts.

This may be advantageous for ensuring a tight attachment of the attachment unit to the conveyor belt module.

The conveyor belt module may be arranged in a brick laying pattern with other similar conveyor belt modules. The conveyor belt module may be a conveyor belt module which is ready to form a single row in a modular conveyor belt.

The recess and/or the extension may be closer to the underside than the load-carrying side as this makes it easier to get a good connection between protrusions and the conveyor belt module.

The recess and/or the extension also ensures that the connection can be established without the protrusion extending beyond the underside, which would not be viable due to the risk of collision among other unwanted effects requiring modifications of other parts of a conveyor belt system.

Furthermore, it will increase the torque of the connection as the distance between the point of connection and the load-carrying side is increased.

The underside is the lower most plane of the conveyor belt module.

The conveyor belt module may be arranged in a brick laying pattern with other similar conveyor belt modules. The conveyor belt module may be a conveyor belt module which is ready to form a single row in a modular conveyor belt.

The recess and/or the extension may be closer to the underside than the load-carrying side as this makes it easier to get a good connection between protrusions and the conveyor belt module.

The recess and/or the extension might also ensure that the connection can be established without the protrusion extending beyond the underside, which would not be viable due to the risk of collision among other unwanted effects requiring modifications of other parts of a conveyor belt system.

Furthermore, it will increase the torque of the connection as the distance between the point of connection and the load-carrying side is increased.

The underside is the lower most plane of the conveyor belt module.

According to an embodiment, there is presented a conveyor belt module for a side flexing modular conveyor belt, said conveyor belt module comprising:
a first set of eye parts defining a first axis, and
a second set of eye parts defining a second axis,
wherein in
a cross-sectional plane, being a primary cross-sectional plane, intersecting a primary outermost eye part and being orthogonal to the first axis and/or the second axis, wherein the primary outermost eye part is an eye part being placed outermost in a primary end of the conveyor belt module in a dimension defined by the first axis and/or the second axis, and/or
a cross-sectional plane, being secondary cross-sectional plane, intersecting a secondary outermost eye part and being orthogonal to the first axis and/or the second axis, wherein the secondary outermost eye part is an eye part being placed outermost in a secondary end of the conveyor belt module in a dimension defined by the first axis and/or the second axis, wherein the secondary end of the conveyor belt module is opposite the primary end of the conveyor belt module,
the conveyor belt module comprises portions of material having positions, which, on both sides of a center plane spanned by:
an axis being parallel with the first axis and/or the second axis, and
an axis in the cross-sectional plane and intersecting the first axis and the second axis,
are having portions on both sides of each of:
a plane orthogonal to the center plane and comprising a first intersection between a line, such as a straight line, through the first eye parts and the cross-sectional plane, and
a plane orthogonal to the center plane and comprising a second intersection between a line, such as a straight line, through the second eye parts and the cross-sectional plane.

According to an embodiment, there is presented a conveyor belt module for a side flexing modular conveyor belt, said conveyor belt module comprising:
A first set of eye parts defining a first axis, and
A second set of eye parts defining a second axis,
wherein the eye parts comprise:
A primary group of eye parts,
A secondary group of eye parts, wherein the secondary group of eye parts comprises eye parts placed on both sides of the primary group of eye parts along an axis being parallel with the first axis and/or the second axis.
wherein, in a cross-sectional plane being orthogonal to a line being
orthogonal to the first axis and/or the second axis, and intersecting both of the first axis and the second axis,
a first width ratio of any eye part is given as the ratio of:
a width in a direction parallel with the first axis and/or the second axis of a surface of the eye part at a distal end in a first direction along an axis in the cross-sectional plane and being orthogonal to the first axis and/or the second axis, to
a largest width in a direction parallel with the first axis and/or the second axis of the eye part,
and a second width ratio of any eye part is given as the ratio of:
a width in a direction parallel with the first axis and/or the second axis of a surface of the eye part at a distal end in a second direction being orthogonal to the first direction, to
the largest width in a direction parallel with the first axis and/or the second axis of the eye part,
and wherein a first width ratio and/or a second width ratio is smaller for eye parts within the primary group of eye parts compared to eye parts within the secondary group of eye parts.

According to a third aspect, there is presented a conveyor belt module system, such as a kit, such as a kit of parts, comprising:
One or more attachment units according to the first aspect, and
One or more conveyor belt modules according to the second aspect.

In an embodiment there is presented a conveyor belt module system wherein one or more protuberances and/or cavities of the one or more attachment units are engaging with one or more recesses and/or extensions of the one or more conveyor belt modules.

In an embodiment there is presented a conveyor belt module system wherein the one or more protuberances and/or cavities of the one or more attachment units are engaging with one or more recesses and/or extensions of the one or more conveyor belt modules on each side of a plane through the central beam, such as through a center of mass of the central beam, and being orthogonal to an axis being:
orthogonal to the first axis and/or the second axis, and intersecting each of the first axis and the second axis.

According to a fourth aspect, there is presented a modular conveyor belt comprising a plurality of conveyor belt modules according to the second aspect. One or more surfaces of the, optionally monolithic, conveyor belt module may be a load carrying surface of the modular conveyor belt.

According to an embodiment there is presented the modular conveyor belt comprising one or more conveyor belt module systems according to the third aspect.

According to an embodiment there is presented the modular conveyor belt being suitable for conveying food products, such as non-packaged food products, such as non-packaged food products comprising animal protein, such as non-packaged food products being anyone of fish or meat or poultry. By 'suitable for conveying food products' may generally be understood that the modular conveyor belt, under normal or foreseeable conditions of use, does not transfer its constituents to food in quantities which could endanger human health, bring about an unacceptable change in the composition of the food or bring about a deterioration in the organoleptic characteristics thereof and/or that modular conveyor belt is easily cleaned and sanitized by continuous or noncontinuous techniques.

According to a fifth aspect, there is presented a conveyor belt system comprising:
The conveyor belt module system according to the third aspect, wherein one or more protuberances and/or cavities of the one or more attachment units are engaging with one or more recesses and/or extensions of the one or more conveyor belt modules,
The modular conveyor belt according to the fourth aspect,
One or more path defining structures, such as rails or guides, for defining and/or controlling a path of the modular conveyor belt, and
An actuator arranged for driving the modular conveyor belt.

According to an embodiment there is presented a conveyor belt system, wherein the conveyor belt system comprises a portion wherein the modular conveyor belt is side flexing. By 'wherein the conveyor belt is side flexing' may generally be understood that the modular conveyor belt is adapted to follow a curved path, such as a path being curved in a plane spanned by:
A conveying direction, and
The first axis and/or the second axis.

According to a sixth aspect, there is presented a method for conveying one or more elements, said method comprising:
placing the one or more elements on or at the modular conveyor belt according to the fourth aspect or the fifth aspect, and
conveying the one or more elements with the modular conveyor belt.

According to an embodiment there is presented a method for conveying one or more elements, wherein said one or more elements comprise food products and/or sticky products, such as non-packaged food products, such as non-packaged food products comprising animal protein, such as non-packaged food products being anyone of fish or meat or poultry.

According to a seventh aspect, there is presented a use of the attachment unit according to the first aspect for exerting a force in a conveying direction on an element being conveyed.

An embodiment of a conveyor belt module can be found in the patent application "CONVEYOR BELT MODULE WITH RELATIVELY NARROW SURFACES" with application number EP20201185.4 filed with the European Patent Office (EPO) on 9 Oct. 2020 (09.10.2020), which application is hereby incorporated in entirety, and in particular the embodiment of the conveyor belt module, cf., claim 1 and the accompanying description (in particular the "Summary of the invention", in particular p. 2, l. 27-p. 6, l. 18) and FIG. 2 (including the accompanying description, in particular p. 15, l. 1-p. 16, l. 2) is hereby incorporated. Features in said patent application (EP20201185.4), and in particular in said embodiment of the conveyor belt module (in particular, p. 2, l. 27-p. 6, l. 18, FIG. 2 and p. 15, l. 1-p. 16, l. 2) may be combined with any embodiment of the present application and may optionally be incorporated into the appended claims (such as protection may be sought for said features). Said features may advantageous for one or more of improving durability, reducing contamination and/or improving cleanability, such as cleanability during cleaning with a pressure washer or a water jet.

The first, second, third, fourth, fifth, sixth and seventh aspect of the present invention may each be combined with any of the other aspects. These and other aspects of the invention will be apparent from and elucidated with reference to the embodiments described hereinafter.

BRIEF DESCRIPTION OF THE FIGURES

The attachment unit, the conveyor belt module, the conveyor belt module system, the modular conveyor belt, the modular conveyor belt system, the method for conveying one or more elements and the use of the attachment unit according to the invention will now be described in more detail with regard to the accompanying figures. The figures show one way of implementing the present invention and is not to be construed as being limiting to other possible embodiments falling within the scope of the attached claim set.

DETAILED DESCRIPTION OF THE INVENTION

Figure 1:
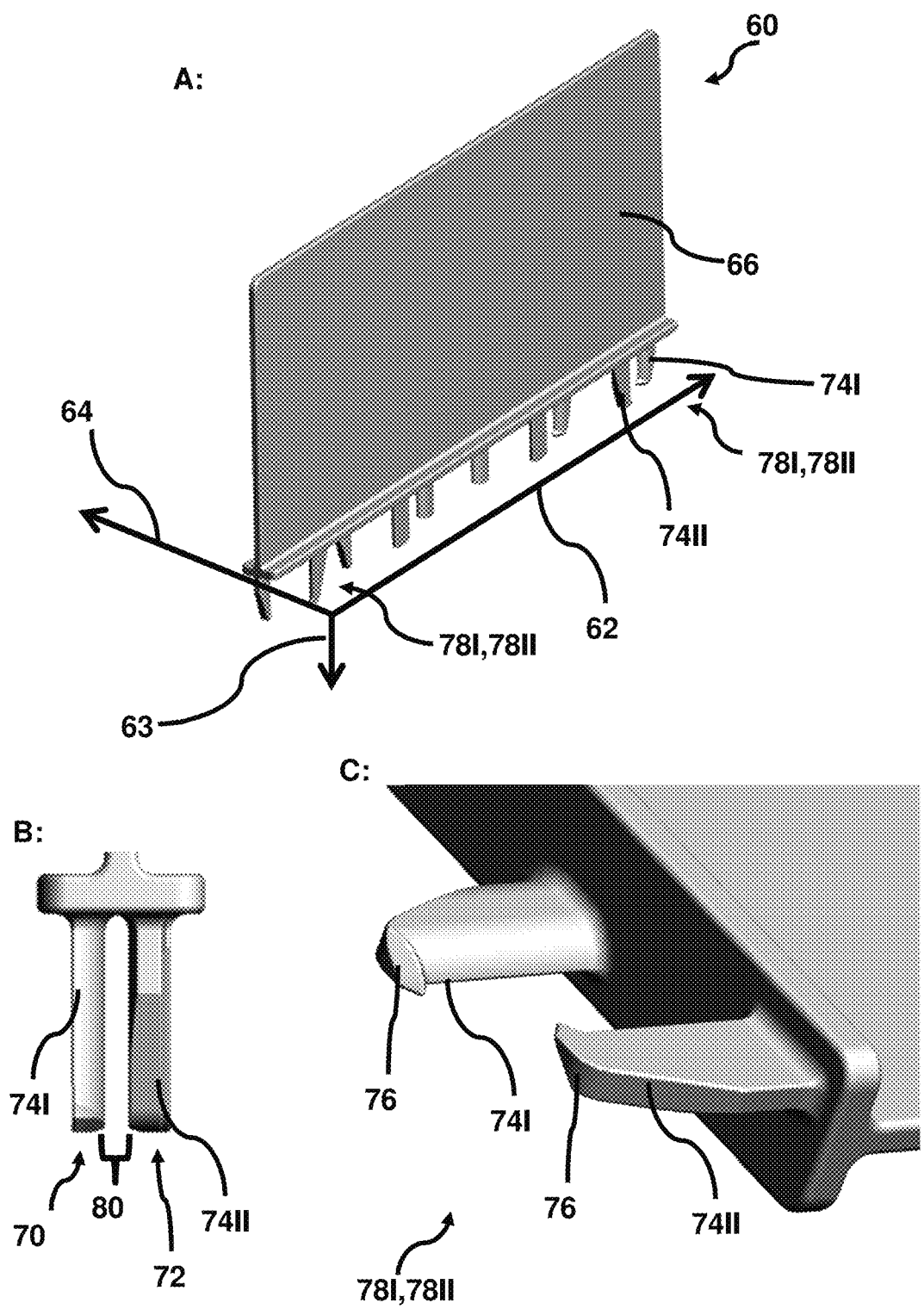
FIGS. 1A-1C illustrates an attachment unit for attachment to a conveyor belt module.
Figure 2:
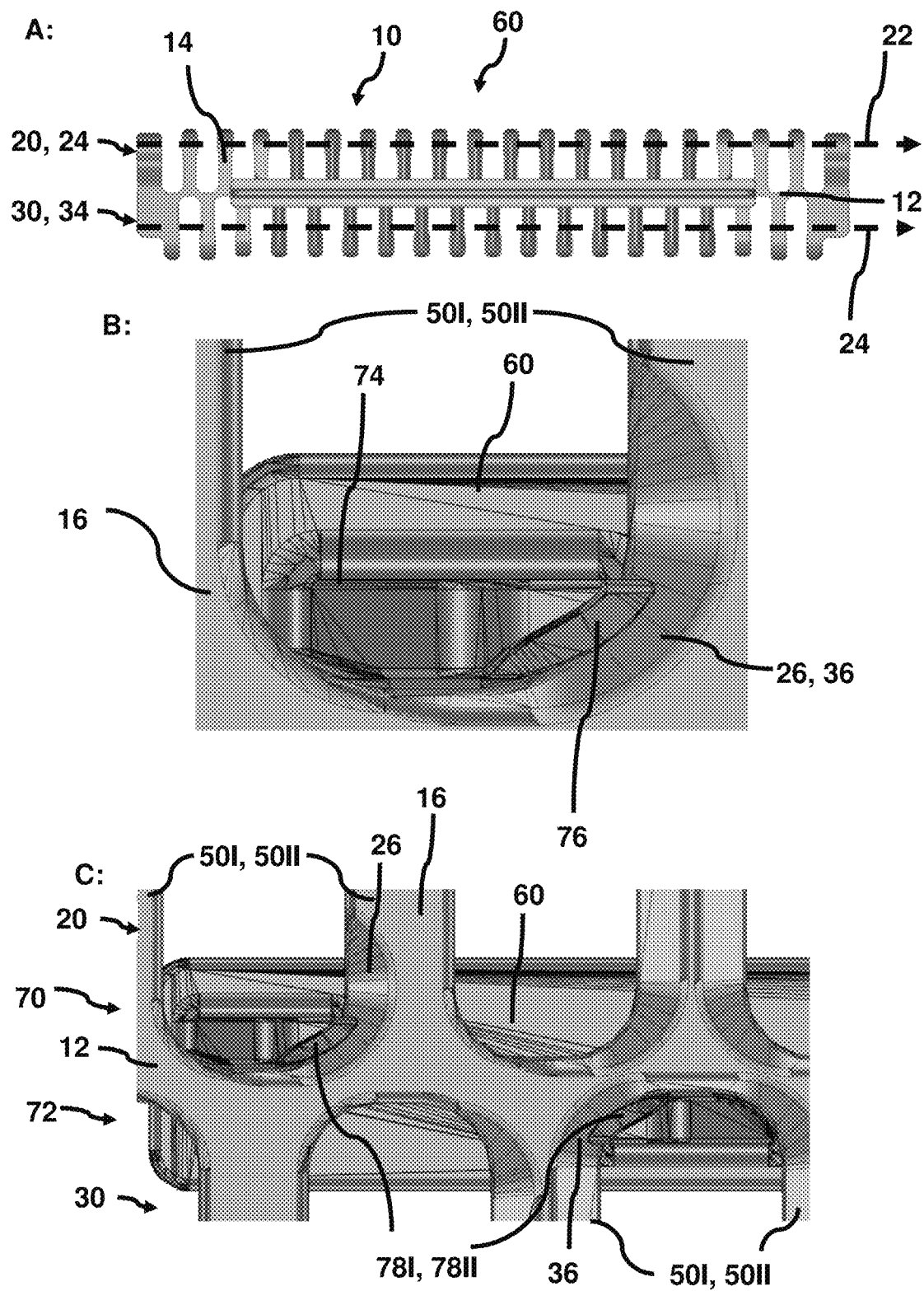
FIGS. 2A-2C illustrates an attachment unit and a conveyor belt module viewed from the load-carrying side and the underside.

FIG. 1 illustrates an attachment unit 60 for attachment to a conveyor belt module 10 (cf., e.g., FIG. 2). The attachment unit 60 is in this embodiment elongated. The attachment unit 60 defines a longitudinal direction 62 and a transverse direction 64 perpendicular to the longitudinal direction 62.

The attachment unit 60 comprises a flight part 66. Here the flight part is a flange and thus the attachment unit 60 is a flight.

The attachment unit 60 comprises a first row 70 of protrusions 74 extending from the attachment unit 60 in the first transverse direction 63. The first row is parallel to the longitudinal direction 62 and at least one protrusion of the protrusions in the first row has a protuberance 76, here in the form of a hook, for connecting to a recess 26, 36 of a conveyor belt module 10. Advantageously the recess is in or at (such as recessed into) the underside of the modular belt part.

The attachment unit 60 comprises a second row 72 of protrusions 74 extending from the attachment unit 60. The second row 72 is parallel to the longitudinal direction 62 and at least one protrusion of the protrusions in the second row has a (hook) protuberance 76, here in the form of a hook, for connecting to a recess 26,36 of a conveyor belt module.

The first and second rows 70,72 are off-set 80 in the second transverse direction 64 such that the rows 70,72 can be positioned on both sides of a beam 12 of a conveyor belt module, such as the conveyor belt module 10 shown in FIG. 2.

Subfigures A and C in FIG. 1 discloses that the attachment unit 60 comprises two pairs of paired protuberances (here hooks) 781, 7811, where protuberances 76 of two nearest and opposite protrusions substantially extend towards each other.

Subfigure A in FIG. 1 shows paired protuberances in each end of the attachment unit 60. This will increase the strength of a connection to a conveyor belt module.

FIG. 2 illustrates an attachment unit 60 and a conveyor belt module 10 viewed from the load-carrying side 14 in subfigure A of FIG. 2 and underside 16 in subfigures B-C of FIG. 2.

Figure 4:
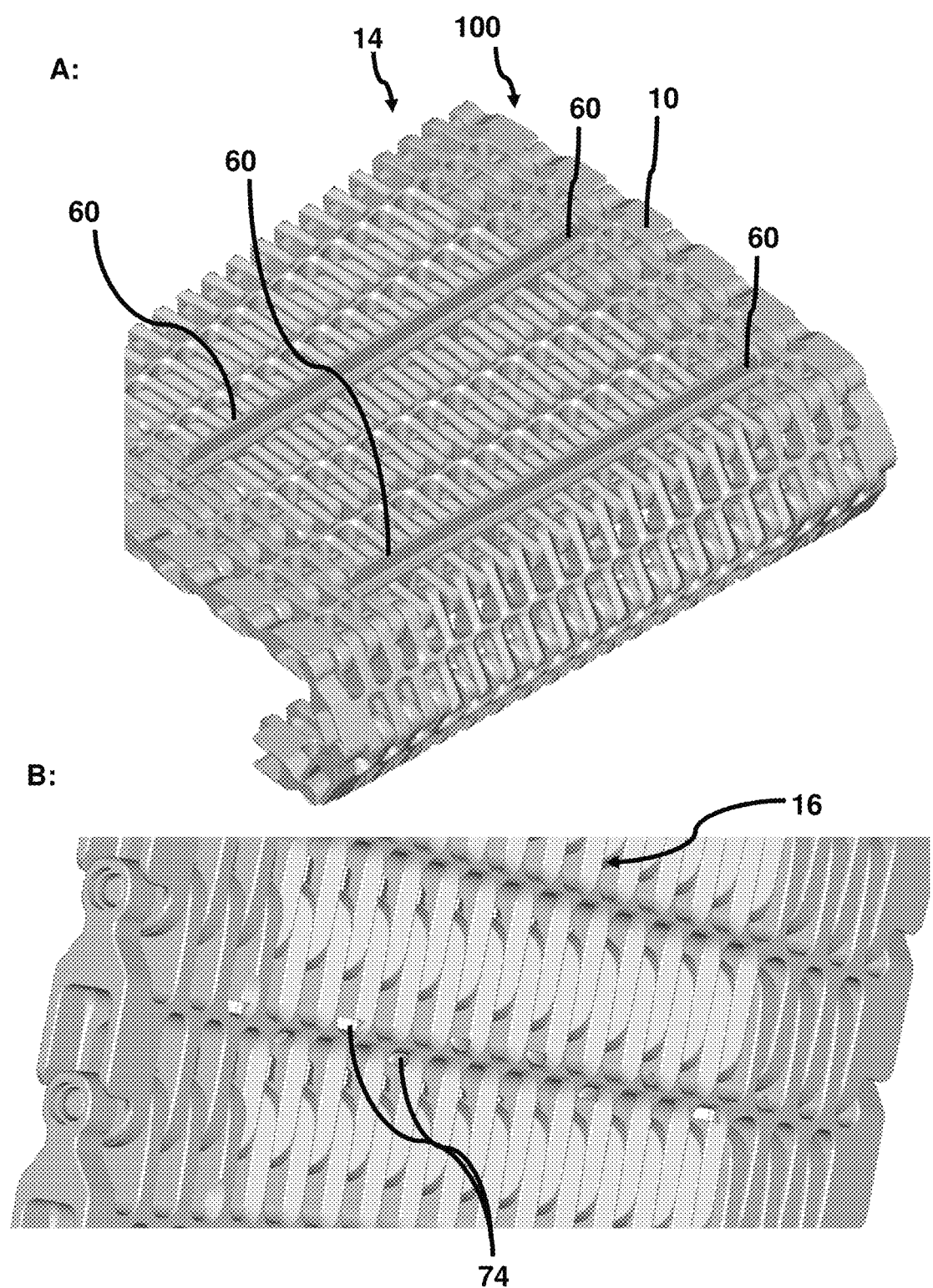
FIGS. 4A-4B illustrates a modular conveyor belt with two attachment units having a flange.

The conveyor belt module 10 may be assembled into a conveyor belt 100, which belt comprises a plurality of conveyor belt modules 10 as shown in FIG. 4.

The conveyor belt module 10 comprises a load-carrying side 14 and an opposite underside 16.

The conveyor belt module 10 comprises a central beam 12, wherein a first set of eye parts extend from said beam 12. The first set of eye parts 20 having along a first axis, such as a first rod axis 22, first apertures 24 for receiving a rod when the conveyor belt module 10 is to be assembled into a modular conveyor belt 100.

The conveyor belt module 10 comprises a second set of eye parts 30, which eye parts extends from the beam 12 in an opposite direction to the first set of eye parts 20 and being transversely off-set relative to the first set of eye parts 20. The second set of eye parts 30 having along a second axis, such as a second rod axis 32, second apertures 34 for receiving a rod when the conveyor belt module 10 is to be assembled into a modular conveyor belt 100.

The conveyor belt module 10 comprises at least two recesses 26, 36, the recesses are configured for engaging with a protuberance 76, such as a hook, of an attachment unit 60.

As shown in subfigures B-C of FIG. 2, a first recess 26 of the at least two recesses 26, 36 is positioned between two neighboring eye parts 501, 5011 of the first set of eye parts 20 on the underside 16 of the conveyor belt module 10. The first recess 26 is configured for engaging a protuberance 76, such as a hook, of an attachment unit 60.

As shown in FIG. 2C, a second recess 36 of the at least two recesses 26,36 is positioned between two neighboring eye parts 501, 5011 of the second set of eye parts 30 on the underside 16 of the conveyor belt module 10. The second recess 28 is configured for engaging with a protuberance 76, such as a hook, of an attachment unit 60.

The two protuberances 76, such as hooks, are paired 781, 7811 as this increases the strength of the connection.

Figure 3A:
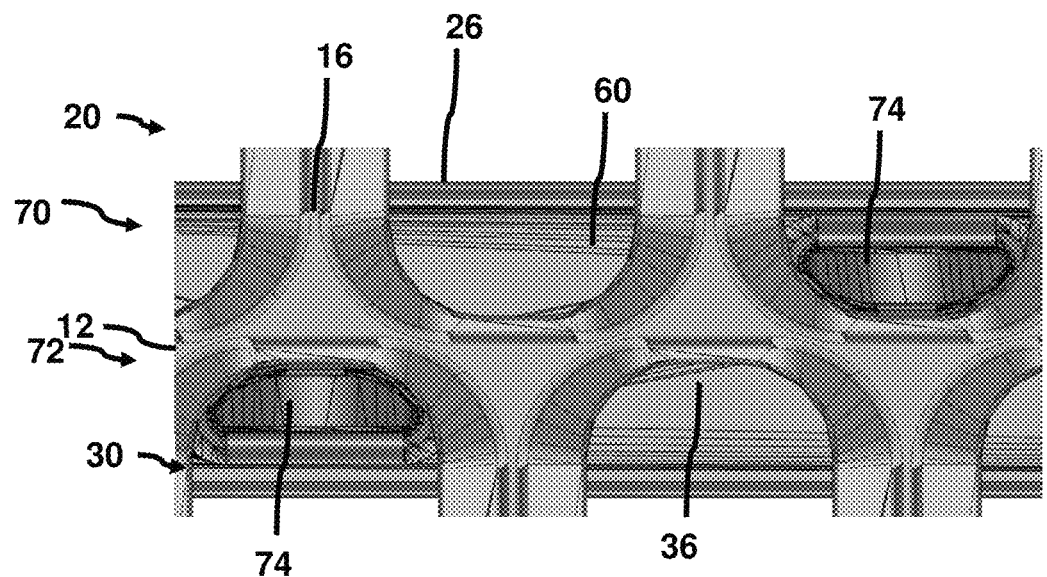
FIG. 3A illustrates another view of an attachment unit and a conveyor belt module viewed from the underside.
Figure 3B:
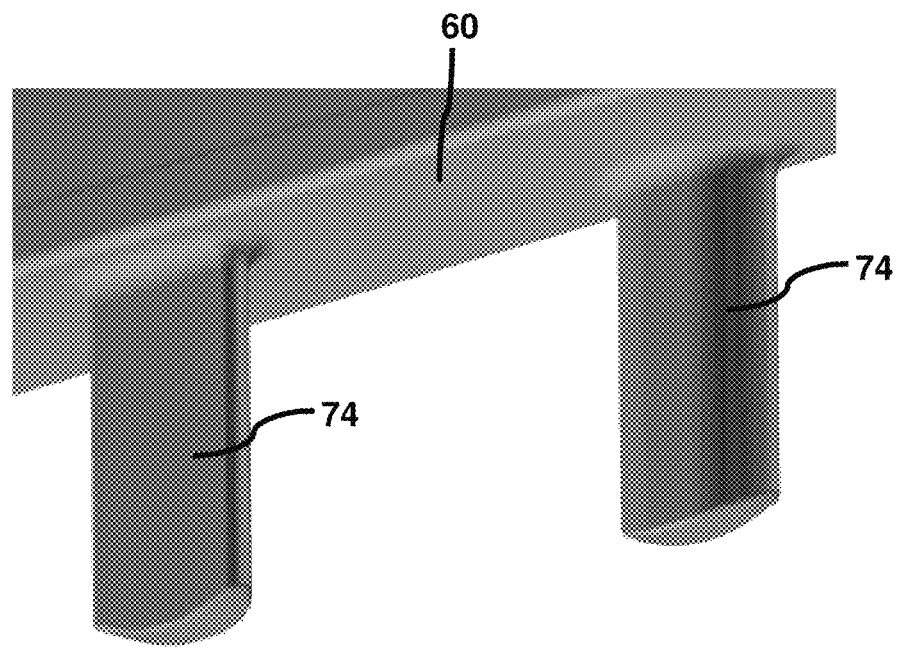
FIG. 3B illustrates another view of an attachment unit.

FIG. 3A illustrates another view of an attachment unit 60 and a conveyor belt module 10 viewed from the underside 16. The view shown in FIG. 3A is another view of the embodiment shown in FIG. 2.

Here attachment unit 60 comprises two protrusions 74 without a protuberance. However, the protrusions 74 will still increase the connection strength as the protrusions are positioned in different rows 70, 72.

FIG. 36 shows an attachment unit 60 with protrusions 74 without any protuberances.

Protrusions 74 alternating between rows 70,72 can be used to further stabilize the attachment unit 60 without increasing the necessary force needed to insert or remove the attachment unit 60.

FIG. 4 illustrates modular conveyor belt 100 with two attachment units 60 each having a flight part 66, which is here a flange.

The attachment units 60 are similar to the attachment unit in FIG. 1 but with a shorter flange (along an axis in the first transverse direction 63).

Subfigure A in FIG. 4 discloses the load-carrying side 14 of the modular conveyor belt 100 and subfigure B in FIG. 4 discloses the underside 14 of the modular conveyor belt 100.

The protrusions 74 (only two protrusions 741-II are marked but more are visible) do not extend beyond the underside 14 of the modular conveyor belt 100 such that collisions and other unwanted effects are prevented.

To sum up, there is presented an attachment unit 60 comprising a flight part 66 and an attachment part comprising first and second sets of protrusions where each of the protrusions is extending away from the flight part 66 in the first transverse direction, and where each of the first set of protrusions and the second set of protrusions comprises one or more protrusions, which each has one or more protuberances and/or cavities each extending in a longitudinal direction and/or a second transverse direction, and wherein the first set of protrusions is off-set 80 along the second transverse direction 64.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. An attachment unit for attachment to an assembled modular conveyor belt, the attachment unit defining:
   a longitudinal direction;
   a first transverse direction being perpendicular to the longitudinal direction;

a second transverse direction being perpendicular to each of the longitudinal direction and the first transverse direction;
the attachment unit comprising:
a flight part for slowing down or blocking an element, wherein the flight part extends along the longitudinal direction; and
an attachment part comprising:
a first row of protrusions being parallel to the longitudinal direction,
wherein the first row of protrusions comprises a plurality of protrusions; and
a second row of protrusions being parallel to the longitudinal direction,
wherein the second set of protrusions comprises one or more protrusions,
wherein each of the protrusions extends away from the flight part in the first transverse direction,
wherein each of the protrusions is a member of a pair of protrusions, the pair of protrusions comprising a protrusion from each of the first row of protrusions and the second row of protrusions,
wherein the protrusions within said pair of protrusions are separated in the longitudinal direction, and are nearest neighbors in the longitudinal direction,
wherein each protrusion within the pair of protrusions comprises a protuberance extending in the longitudinal direction toward the other protuberance within the pair of protrusions, wherein each protuberance is configured to engage with a recess of the modular conveyor belt, and
wherein the first row of protrusions is off-set along the second transverse direction such that there is a gap between the first row of protrusions and the second row of protrusions, wherein said gap extends in the second transverse direction.

2. The attachment unit according to claim 1, wherein the flight part is means for exerting a force on an element, and the flight part comprises:
a plate or flange extending from the attachment unit in a direction being opposite to a direction of extension of the plurality of protrusions in the first row of protrusions and the one or more protrusions in the second row of protrusions; and/or
a high friction surface having a larger friction coefficient between the high friction surface and an element than a friction coefficient between a surface of the attachment unit and the element.

3. The attachment unit of claim 1, further comprising a conveyor belt module for a modular conveyor belt, comprising: one or more recesses and/or extensions for engaging with the one or more protuberances of the attachment unit.

4. The conveyor belt module according to claim 3, further comprising:
a central beam;
a first set of eye parts extending from the central beam and defining a first axis; and
a second set of eye parts extending from the central beam and defining a second axis.

5. The conveyor belt module according to claim 3, wherein said plurality of recesses and/or extensions comprises at least one recess and/or extensions on each side of a plane through a center of mass of a central beam, and being orthogonal to an axis being orthogonal to a first axis and/or a second axis, and intersecting each of the first axis and the second axis.

6. A conveyor belt module system comprising a kit of parts, comprising:
an attachment unit comprising:
a flight part for slowing down or blocking an element, wherein the flight part extends along a longitudinal direction; and
an attachment part comprising:
a first row of protrusions being parallel to the longitudinal direction, wherein the first row of protrusions comprises a plurality of protrusions; and
a second row of protrusions being parallel to the longitudinal direction, wherein the second row of protrusions comprises one or more protrusions,
wherein each of the protrusions extends away from the flight part in a first transverse direction perpendicular to the longitudinal direction,
wherein each of the protrusions is a member of a pair of protrusions, the pair of protrusions comprising a protrusion from each of the first row of protrusions and the second row of protrusions,
wherein the protrusions within said pair of protrusions are separated in the longitudinal direction, and are nearest neighbors in the longitudinal direction,
wherein each protrusion within the pair of protrusions comprises a protuberance extending in the longitudinal direction toward the other protuberance within the pair of protrusions, wherein each protuberance is configured to engage with a recess of a modular conveyor belt of a conveyor belt module, and
wherein the first row of protrusions is off-set along a second transverse direction such that there is a gap between the first row of protrusions and the second row of protrusions, wherein said gap extends in the second transverse direction.

7. The conveyor belt module system according to claim 6, wherein the one or more protuberances of the one or more attachment units are engaging with one or more recesses and/or extensions of the one or more conveyor belt modules.

8. The conveyor belt module system according to claim 7, wherein the one or more protuberances of the one or more attachment units are engaging with one or more recesses and/or extensions of the one or more conveyor belt modules on each side of a plane through a central beam, such as through a center of mass of the central beam, and being orthogonal to an axis being: orthogonal to a first axis and/or a second axis, and intersecting each of the first axis and the second axis.

9. The conveyer belt module system according to claim 6, wherein the modular conveyor belt comprises a plurality of conveyor belt modules.

10. The conveyer belt module system according to claim 9, further comprising:
one or more path defining structures, such as rails or guides, for defining and/or controlling a path of the modular conveyor belt; and
an actuator arranged for driving the modular conveyor belt.

11. The attachment unit according to claim 1, wherein the attachment unit is used for exerting a force in a conveying direction on an element being conveyed.

12. The attachment unit according to claim 1, wherein the protuberance is a hook, a barb, or a detent ball.

13. The attachment unit according to claim 2, wherein the high friction surface comprises barbs or serrations.

14. The conveyor belt module according to claim 4, wherein the conveyor belt module has rotational symmetry of second order around one or more of:

a third axis being parallel with the first axis and/or the second axis;

a fourth axis being orthogonal to the first axis and/or the second axis and intersecting both of the first axis and the second axis, and a fifth axis being orthogonal to each of:
    the third axis, and
    the fourth axis.

\* \* \* \* \*